United States Patent [19]

Sjardijn et al.

[11] Patent Number: 4,994,426

[45] Date of Patent: Feb. 19, 1991

[54] CATALYST AND PROCESS FOR POLYMERIZATION OF NORBORNENE DERIVATIVES

[75] Inventors: Willem Sjardijn; Wilhelmina J. M. van der Linden-Lemmers, both of Amsterdam, Netherlands

[73] Assignee: Shell Oil Company, Houston, Tex.

[21] Appl. No.: 413,799

[22] Filed: Sep. 28, 1989

[30] Foreign Application Priority Data

Sep. 29, 1988 [GB] United Kingdom ............... 8822911

[51] Int. Cl.$^5$ ............................................... C08F 4/22
[52] U.S. Cl. ............................ 502/158; 502/102; 502/117; 526/126; 526/308
[58] Field of Search .................. 502/158, 102, 117

[56] References Cited

U.S. PATENT DOCUMENTS

| | | | |
|---|---|---|---|
| 4,020,254 | 4/1977 | Ofstead | 502/117 X |
| 4,357,449 | 12/1982 | Yi | 526/74 |
| 4,469,809 | 9/1984 | Klosiewicz | 502/117 |
| 4,481,344 | 11/1984 | Newburg | 526/283 |
| 4,567,159 | 1/1986 | Banks et al. | 502/158 X |
| 4,661,575 | 4/1987 | Tom | 526/283 |
| 4,729,976 | 3/1988 | Sjardijn | 502/102 |
| 4,748,216 | 5/1988 | Tom | 526/77 |

FOREIGN PATENT DOCUMENTS 53-103000 9/1978 Japan .
2005280 4/1979 United Kingdom .

*Primary Examiner*—Patrick P. Garvin

[57] ABSTRACT

Disclosed is a process for the polymerization of norbornene derivatives which comprises contacting the monomer(s) with a catalytic system comprising the following two components:

(1) a tungsten compound which is the product of combining a tungsten halide with a para-trihalomethylphenol which can be described by the formula

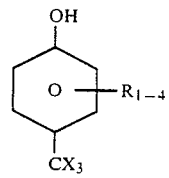

in which each R is selected from alkyl and halide, and (2) a compound of the general formula:

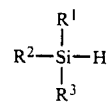

in which at least two of $R^1$, $R^2$ and $R^3$ are selected from unsubstituted and substituted $C_{1-20}$ hydrocarbyl.

7 Claims, No Drawings

CATALYST AND PROCESS FOR POLYMERIZATION OF NORBORNENE DERIVATIVES

BACKGROUND OF THE INVENTION

This invention relates to the polymerization of norbornene derivatives such as dicyclopentadiene. The invention further relates to a catalytic system suitable for use in processes for the polymerization of norbornene derivatives.

U.S. Pat. No. 4,020,254 discloses a process for ring-opening polymerization of cycloolefins using a catalyst comprising (a) a transition metal salt selected from tungsten halides and tungsten oxyhalides,
(b) a compound selected from dialkylaluminum halides, alkylaluminum sesquihalides and alkylaluminum dihalides, and
(c) an alkoxysilane.

More particularly, compounds are proposed of the formula RO—SiR′$_3$, wherein R is CH$_3$— or Y—CH$_2$—CH$_2$—, Y is hydrogen, halogen, nitrile, C$_{1-4}$ alkoxy, R′ is a methyl or ethyl radical, and the molar ratios of (a)/(b)/(c) are within the range of 1/0.5–10/0.5–3.

U.S. Pat. No. 4,481,344 discloses a process using a two-part tungsten-based metathesis catalyst system for preparation of a thermoset polymer of dicyclopentadiene units wherein a halogen-containing hydrocarbyl additive is incorporated. The hydrocarbyl additive is includes in one of a plurality of reactant streams containing dicyclopentadiene, and contains at least one trihalogen-substituted carbon atom or at least one activated halogen atom. The halogen-containing hydrocarbyl additive is selected from chloroform, carbon tetrachloride, 1,1,1-trichloroethane, hexachloropropane, hexachloroacetone, ethyl trichloroacetate, alpha,alpha,alpha-trichlorotoluene, allyl chloride, allyl bromide, benzyl chloride and hexachlorocyclopentadiene.

The tungsten catalyst is made soluble in the monomer suspension stream by the addition of a small amount of an alcoholic or a phenolic compound. Suitable phenolic compounds are disclosed to be phenol, alkyl phenols and halogen-containing phenols, with tert-butyl phenol, tert-octyl phenol and nonyl phenol being most preferred.

British Patent Application No. 2,005,280 discloses a method for the preparation of random copolymers of dicyclopentadiene and a compound selected from cyclopentene, cyclooctene, 1,5-cyclooctadiene and 1,5,9-cyclododecatriene by the use of a catalyst system comprising (a) tungsten hexachloride;
(b) an organosilicon compound of the general formula R$_{4-n}$Si(Y)$_n$ in which the R substituents are selected from alkyl, cycloalkyl, aryl and aralkyl radicals, Y represents either a hydroxy group or a vinyl radical, and n is 1 or 2;
(c) a di-n-alkylether or a phenyl-n-alkylether; and
(d) an organo tin compound represented by the general formula

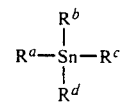

in which R$^a$, R$^b$, R$^c$ and R$^d$ are selected from n-alkyl, phenyl and7121 vinyl radicals.

Japanese Patent Application No. 53103000 discloses a process for the preparation of ring-opened polymers by ring-opening polymerization of norbornene-type derivatives containing polar or aromatic hydrocarbon groups and/or norbornadiene derivatives and cycloolefin compounds optionally in the presence of unsaturated polymers containing C—C bonds, using a catalyst system obtained from (a) organic metal compounds containing metals selected from Group IVB or IVA metals and (b) the product of the reaction of (1) the reaction product formed by reaction of an oxide of tungsten and/or molybdenum and a Lewis acid and (2) a silanol compound of formula R$_{4-n}$Si(OH)$_n$, wherein R is halogen, alkyl having less than 15 carbon atoms, aryl or alkoxy, and n=1, 2 or 3.

European Patent Specification No. 0084888 relates to a process for the manufacture of a thermoset homopolymer by combining a first reactant stream containing the activator of a metathesis-catalyst system and a second reactant stream containing the catalyst of the metathesis-catalyst system, at least one of which streams contains dicyclopentadiene to form a reaction mixture and immediately injecting the reaction mixture into a mold where polymerization occurs. The catalyst may be a tungsten-containing compound which can be solubilized by the addition of a small amount of a phenolic compound. Suitable phenolic compounds include phenol, alkylphenols and halogenated phenols, with tert-butylphenol, tert-octylphenol and nonylphenol being most preferred. The starting dicyclopentadiene for this process must be essentially pure.

European Patent Application No. 0222432 relates to a process for the bulk polymerization of dicyclopentadiene by contacting it with a catalyst system comprising (i) a tungsten compound containing a phenyl group carrying a bulky alkyl group and (ii) an organic tin compound containing one hydrogen atom bound to the tin atom. This process has as advantages that the starting dicyclopentadiene need not be essentially pure and that the catalyst is more stable and less sensitive to oxygen.

The processes described above can be applied in a reaction injection molding (RIM) process. A RIM process involves mixing of two or more low-viscosity streams of components of a catalyst system dissolved in the monomer to be polymerized and injecting the combined streams into a mold where the monomer polymerizes to form a solid infusible mass.

One requirement to be met for a RIM process is a catalytic system which produces a high polymerization rate. Moreover, it is desirable that the polymerization start at a temperature in the range of from 25° to 90° C., so that the compounds of the catalytic system can be mixed at ambient temperature, and that after slight heating of the mixture the exothermic polymerization is initiated.

Due to the modern requirements of such RIM processes there is still a strong need to further enhance the rate of polymerization of dicyclopentadiene alone or in combination with other related cycloalkadiene comonomers, such as norbornene derivatives.

Therefore it is an object of the present invention to enhance the rate of polymerization of dicyclopentadiene, optionally blended with other norbornene derivatives such as cycloalkadiene or cycloalkene comonomers, by using a more active catalytic system.

SUMMARY OF THE INVENTION

According to the invention, a process is provided for the polymerization of norbornene derivatives, preferably dicyclopentadiene, optionally blended with other related cycloalkadiene comonomers, which process comprises contacting the monomer(s) with a catalytic system comprising the following two components:

(1) a tungsten compound which is the product of combining a tungsten halide with a para-trihalomethylphenol which can be represented by the formula

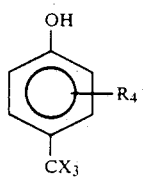

(I)

in which each R is selected from hydrogen alkyl and halide, and (2) a compound of the general formula:

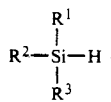

(II)

in which $R^1$, $R^2$ and $R^3$ are independently selected from hydrogen, substituted and unsubstituted $C_{1-20}$ hydrocarbyl, including alkyl, cycloalkyl having in the range of from 3 to 6 carbon atoms in the cycloalkyl ring, and phenyl and no more than one of $R^1$, $R^2$ and $R^3$ is hydrogen.

DETAILED DESCRIPTION OF THE INVENTION

The tungsten halide for the preparation of component (1) is preferably a bromide or chloride and is more preferably tungsten hexachloride or tungsten oxytetrachloride. The para-trihalomethylphenol to be used in component (1) may be ortho-chloro-para-trifluoromethylphenol, ortho-methyl-para-trichloromethylphenol, ortho-methyl-para-trifluoromethylphenol, para-tribromomethylphenol, para-trichloromethylphenol or para-trifluoromethylphenol, for example, the latter being most preferred. Also mixtures of the para-trihalomethylphenols may be used.

The phenol compounds have a trihalomethyl substituent on the para position in order to reach the highest polymerization rates. Moreover, it was surprisingly found as further advantages of the use of the proposed phenol compounds that catalyst component (1) appeared to be very storage-stable in the norbornene derivative to be polymerized, that catalyst component (1) could be activated with a silane compound as described above for formula II in place of a tin hydride, and that the starting mixture containing such silicon-containing activator behaves as a thin liquid at ambient temperature, while polymerization occurs only upon heating.

Component (1) may be prepared in the presence of a suitable solvent. Examples of such solvents are cyclopentane, cyclohexane, benzene, toluene, o-, m- and p-xylenes, chlorobenzene and 1,2-dichlorobenzene. According to a more preferred embodiment, dicyclopentadiene or co-monomer mixtures containing dicyclopentadiene are used as solvents for the complete component (1).

Suitable molar ratios of the para-trihalomethylphenol and the tungsten compound are within the range of from about 1:1 to about 6:1, preferably about 3:2 to about 3:1.

The preparation of component (1) may be effected by suspending a tungsten halide in the solvent and adding the para-trihalomethylphenol to the suspension formed, stirring the reaction mixture, and blowing a stream of dry inert gas, for example nitrogen, through the mixture to remove the hydrogen halide which is formed.

Component (2) is preferably a compound of the general formula II in which at least two of $R^1$, $R^2$ and $R^3$ represent a $C_{1-10}$, preferably $C_{2-4}$, alkyl, cycloalkyl, allyl or phenyl group. Examples of such activator components include dibutyl silane, triethyl silane, trihexyl silane, dipropyl silane, dipentyl silane, dicyclohexyl silane, dicyclopentyl silane, dioctyl silane, allyldimethyl silane, diphenyl silane, and mixtures thereof. Triethyl silane and diphenyl silane are preferred. Examples of substituents of $R^1$, $R^2$ and $R^3$ include $C_{1-20}$ alkoxy and chlorine and fluorine.

The catalyst may optionally include a trisubstituted tin hydride, such as tributyl tinhydride, tripropyl tinhydride, tripentyl tinhydride, methyldicyclohexyl tinhydride, cyclopentyldimethyl tinhydride, trioctyl tinhydride, triphenyl tinhydride and phenyldimethyl tinhydride, for example.

The polymerization process of the invention can be carried out at a molar ratio of tungsten compound to monomer and a molar ratio of silicon compound to tungsten, which may vary within wide ranges. Preferably, the former ratio is in the range of from about 1:20,000 to about 1:100, most preferably 1:1,000 to 1:10,000, and the latter ratio is within the range of from about 15:1 to about 1:1; preferably 12:1 to 3:1.

A technical grade of dicyclopentadiene may be used as the monomer, which may contain impurities distilling below a top temperature of 100° C. at a pressure of 12,400±400 Pa. Such impurities usually form azeotropic mixtures with dicyclopentadiene. The technical grade may contain, for example, at least 83% by weight of pure dicyclopentadiene. An advantage of the use of such technical grades is that they are usually liquid at ambient temperature, say at 20° C.; pure endo-dicyclopentadiene has a melting point of 32° C. Commercially, dicyclopentadiene is usually available in the endo form, but, if desired, the exo form may be used, or mixtures of the endo and exo form. The technical grade of DCPD is preferably obtained by dimerization of a technical grade of cyclopentadiene, which, in turn, is obtained by fractional distillation of the products obtained by cracking of hydrocarbons, for example a naphtha fraction, in the presence of steam.

Generally, the polymerization takes place in bulk, but components (1) and (2) may be dissolved in a small amount of solvent, such as toluene. It is preferred to use, however, dicyclopentadiene, optionally blended with co-monomers, as a solvent for at least one of the two catalyst components. For the silicon compounds, no solvent at all may also suffice, since these compounds are usually a liquid at ambient temperature.

A preferred method for the polymerization of a dicyclopentadiene-containing mixture is to contact a stream of component (1) with a stream of component (2) whereby at least one of the streams has been admixed with the dicyclopentadiene-containing monomer mixture, prior to the polymerization, and to then polymerize the dicyclopentadiene-containing mixture. For example, it is possible to dissolve component (1) in dicyclopentadiene and to dissolve component (2) in dicyclopentadiene or in another solvent or to use the activator without any solvent. After both streams have contacted with each other, the resulting mixture is preferably injected or poured into a mold where polymerization of the dicyclopentadiene-containing mixture takes place.

Component (1) and component (2) may be stored in a dicyclopentadiene-containing mixture for some time, provided that the dicyclopentadiene containing mixture contains not more than a few parts per million (ppm) by weight of water. Component (2) is storable in the dicyclopentadiene-containing mixture for one to two months without losing its activity.

Within the term "dicyclopentadiene containing mixture" are meant mixtures which contain pure endo- or exo-dicyclopentadiene in addition to isomers and structurally related monomers.

The process according to the present invention may be carried out in the presence of auxiliary materials, for example fillers, fibers, anti-oxidants, tougheners, stabilizers, pigments and plasticizers.

The catalytic system used in the process is specifically of interest for reaction injection molding or casting. Because of the low viscosity of the monomer/catalyst system mixture, the polymerization is very suitable for large castings with intricate molds. The process is usually carried out at an average polymerization temperature in the range of from 50° C. to 200° C. It is a favorable feature of the present invention that components (1) and (2) of the catalytic system are very stable.

The product obtained by the process according to the invention may be subjected to a heat-treatment at a temperature in the range of from 200° C. to 300° C. for about one hour or longer. By this heat-treatment the glass transition temperature of the polymer is increased from a starting value of about 125° C. to about 160° C., which renders the polymer more useful.

The process according to the present invention allows quantitative polymerization, e.g., the polydicyclopentadiene being free from dicyclopentadiene monomer. For this reason, the polydicyclopentadiene is free from odor and can be used for a large number of applications, for example, (a) structural composites, for example in the automotive industry, and (b) application in the electrical industry, for example in printed circuit boards.

The invention further provides a novel catalytic system suitable for use in the process according to the present invention which system may be prepared by combining the following two components:

(1) a tungsten compound which is the product of combining a tungsten halide with a para-trihalomethylphenol which can be represented by the formula

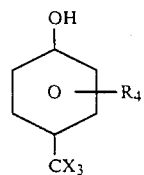

in which each R is selected from hydrogen alkyl and halide, and (2) a compound of the general formula:

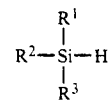

in which at least two of $R^1$, $R^2$ and $R^3$ are selected from substituted and unsubstituted $C_{1-20}$ alkyl, substituted and unsubstituted cycloalkyl having from 3 to 6 carbon atoms in the cycloalkyl ring, and substituted and unsubstituted phenyl.

The following examples further illustrate the invention. The starting dicyclopentadiene for the (DCPD) examples was a technical grade having an initial boiling point of 90° C. and of which 3.0% was distilled over at a temperature of 100° C. and a pressure of 12,000 Pa, the distillation being carried out in a column having 14 theoretical trays. THe DCPD was dried by contacting with a 4A molecular sieve until it contained less than 1 part per million by weight of water. THe DCPD contained (% by weight) 3.5% isopropenyl-2-norbornene, 1.1% 5-cis and trans-1-propenyl-2-norbornene, and 0.7% 5-methyltetrahydroindene.

EXAMPLE 1

$WCl_6$ (1.73 mmol) was suspended in dried cyclopentane (50 ml) under a dry nitrogen blanket. p—$CF_3$—phenol (3.5 mmol) in cyclopentane (20 ml) was added. After completion of the reaction the catalyst was isolated by evaporation of the solvent.

COMPARATIVE EXPERIMENT 1

$WCl_6$ (1.73 mmol) was suspended in dried cyclopentane (5 ml) at ambient temperature under a dry nitrogen blanket. 2,3,4,6-Tetrafluorophenol (3.5 mmol) in cyclopentane (25 ml) was added. After completion of the reaction the catalyst was isolated by evaporation of the solvent.

COMPARATIVE EXPERIMENT 2

$WCl_6$ (3.67 mmol) was suspended in dried cyclopentane (30 ml) under a dry nitrogen blanket. 2,6-Diisopropylphenol (7.33 mmol) in cyclopentane (20 ml) was added at ambient temperature. After completion of the reaction the catalyst was isolated by evaporation.

EXAMPLE 2

A 30-ml serum cap bottle was charged with the catalyst of Example 1 (22 mg) and dried DCPD (10 ml) under a dry nitrogen blanket. Subsequently tributyltinhydride (80 mg) was added, resulting in an exothermic polymerization. A maximum temperature of 170° C. was reached 2 minutes after introduction of the cocatalyst.

EXAMPLE 3

A 30-ml serum cap bottle was charged with the catalyst of Example 1 (22 mg) and dried DCPD (10 ml) under a dry nitrogen blanket. This mixture was stored for 7 days. Then tributyltinhydride (80 mg) was added, resulting in an exothermic polymerization. Two minutes after introduction of the cocatalyst a maximum temperature of 170° C. was recorded.

Comparative Experiment 3

A 30 ml serum cap bottle was charged with the catalyst of Comparative Experiment 1 (11 mg) and dried DCPD (10 ml) under a dry nitrogen blanket. After 7 days storage tributyltinhydride (40 mg) was added. Nothing happened at ambient temperature. After 15 minutes the mixture was heated to 90° C., which resulted in a weak exotherm. After 10 minutes a maximum temperature of 135° C. was recorded.

When the cocatalyst was added directly to the catalyst solution in DCPD, a maximum temperature of 180° C. was reached after 1 minute.

EXAMPLE 4

A 30 ml serum cap bottle was charged with the catalyst of Example 1 (22 mg) and dried DCPD (10 ml) under a dry nitrogen blanket. Subsequently diphenylsilane (60 mg) was added. The reactive mixture was placed in an oil bath of 90° C. resulting in an exothermic polymerization. After 5.5 minutes a maximum temperature of 210° C. was recorded.

Comparative Experiment 4

A 30 ml serum cap bottle was charged with the catalyst of Comparative Experiment 2 (70 mg) and dried DCPD (10 ml) under a dry nitrogen blanket. Subsequently diphenylsilane (150 mg) was added. The reactive mixture was placed in an oil bath of 90° C. After 33 minutes a maximum temperature of 190° C. was recorded. With less catalyst (11 mg) and cocatalyst (25 mg) no exotherm was observed although the mixture was kept at 90° C. for 1.5 hours. Further heating to 125° C. still resulted in an exothermic polymerization. After 10 minutes a maximum temperature of 245° C. was recorded.

EXAMPLE 5

A 30 ml serum cap bottle was charged with the catalyst of Example 1 (20 mg) and dried DCPD (10 ml) under a dry nitrogen blanket. Subsequently triethylsilane (0.15 ml) was added. The reactive mixture was placed in an oil bath of 90° C. resulting in an exothermic polymerization. After 5 minutes a maximum temperature of 180° C. was recorded.

EXAMPLE 6

Similarly as described in Examples 4 and 5, an experiment was carried out using the catalyst of example 1 (20 mg) and dried DCPD (10 ml) under a dry nitrogen blanket, whereas allyldimethylsilane (0.15 ml) was added. After 7 minutes a maximum temperature of 200° C. was recorded.

EXAMPLE 7

Similarly as described in Examples 4, 5 and 6, an experiment was carried out using the catalyst of Example 1 (20 mg) and dried DCPD (10 ml) under a dry nitrogen blanket and subsequent addition of dimethylphenylsilane (0.15 ml) giving a maximum temperature of 220°60 C. after 11 minutes.

From Examples 4, 5, 6 and 7, it will be appreciated that the starting mixtures all remained in the form of a thin liquid at ambient temperature and that the polymerization occurred only upon heating, desirable results for RIM applications.

What is claimed is:

1. A catalyst system for the polymerization of norbornene derivatives which is the product of combining components comprising:
    (a) a tungsten component which is the product of contacting a tungsten halide with a para-trihalomethylphenol which can be described by the formula

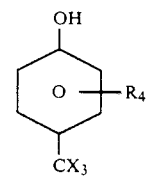

in which each X is halide and each R is selected independently from hydrogen, alkyl and halide, and
    (b) a compound of the general formula

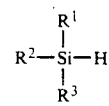

in which $R^1$, $R^2$ and $R^3$ are independently selected from hydrogen and $C_{1-20}$ hydrocarbyl, and no more than one of $R^1$, $R^2$ and $R^3$ is hydrogen.

2. The catalyst system of claim 1 in which the tungsten halide comprises at least one of tungsten hexachloride and tungsten oxytetrachloride.

3. The catalyst system of claim 1 in which the para-trihalophenylphenol is selected from ortho-chloro-para-trifluoromethylphenol, ortho-methyl-para-trichloromethylphenol, ortho-methyl-para-trifluoro-methylphenol, para-tribromomethylphenol, para-trichloromethylphenol, para-trifluoromethylphenol and mixtures thereof.

4. The catalyst system of claim 1 in which the para-trihalomethylphenol is para-trifluoromethylphenol.

5. The catalyst system of claim 1 in which the molar ratio of the para-trihalomethylphenol to the tungsten compound is within the range of 3:2 to 3:1.

6. The catalyst system of claim 1 in which the molar ratio of component (2) to the tungsten compound is within the range of from 12:1 to 3:1.

7. The catalyst system of claim 1 in which component (2) is selected from the group consisting of triethyl silane and diphenyl silane.

* * * * *